United States Patent
Feil et al.

(10) Patent No.: US 9,885,826 B2
(45) Date of Patent: Feb. 6, 2018

(54) OPTICAL SEAM REDUCTION (71) Applicant: MIORTECH HOLDING B.V., AE Eindhoven (NL)

(72) Inventors: Hermanus Feil, AE Eindhoven (NL); Doeke Jolt Oostra, AE Eindhoven (NL)

(73) Assignee: MIORTECH HOLDING B.V., Eindhoven (NL)

( * ) Notice: Subject to any disclaimer, the term of this patent is extended or adjusted under 35 U.S.C. 154(b) by 0 days.

(21) Appl. No.: 15/027,215

(22) PCT Filed: Oct. 1, 2014

(86) PCT No.: PCT/NL2014/050675
§ 371 (c)(1),
(2) Date: Apr. 4, 2016

(87) PCT Pub. No.: WO2015/050442
PCT Pub. Date: Apr. 9, 2015

(65) Prior Publication Data
US 2016/0245995 A1 Aug. 25, 2016

(30) Foreign Application Priority Data
Oct. 4, 2013 (NL) .................................... 2011561

(51) Int. Cl.
*G02B 6/06* (2006.01)
*G02B 6/08* (2006.01)
(Continued)

(52) U.S. Cl.
CPC .............. *G02B 6/08* (2013.01); *G02B 1/045* (2013.01); *G02B 6/0038* (2013.01);
(Continued)

(58) Field of Classification Search
CPC ... G02B 6/06; G02B 6/08; G02B 6/04; G02B 6/4298; A61B 1/07
See application file for complete search history.

(56) References Cited

U.S. PATENT DOCUMENTS 4,139,261 A 2/1979 Hilsum
5,056,893 A 10/1991 Holz et al.
(Continued)

FOREIGN PATENT DOCUMENTS

EP 0 179 913 A1 3/1985
EP 2 306 437 A1 4/2011
(Continued)

OTHER PUBLICATIONS

International Search Report for Application No. PCT/NL2014/050675 filed Oct. 1, 2014 on behalf of Miortech Holding B.V. dated Jan. 26, 2015. 6 pages.
(Continued)

*Primary Examiner* — Jennifer Doan
(74) *Attorney, Agent, or Firm* — Steinfl + Bruno LLP (57) ABSTRACT

Optical wave guide panel for visualization of an image, wherein the panel has an image interface surface for interfacing with an image to be visually presented and a viewing interface surface opposite the image interface surface for reviewing the image located at the image interface surface. The panel has at least one boundary, and is fabricated from a transparent solid material. The panel is provided with a pattern of grooves and to the image interface surface, extending at lease partially into the panel between image interface surface and the viewing interface surface of the panel. The pattern of grooves comprises at least one groove following a contour of the at least one boundary of the panel. The boundary of the panel exhibits an angle with respect to the at least one groove, such that a length of a panel segment, defined by the groove following the contour of the at least (Continued)

one boundary and the boundary at the viewing interface surface, along a cross section of the panel transverse to a direction of said at least one groove is greater than a length of the segment at the image interface surface along the cross section.

18 Claims, 7 Drawing Sheets

(51) Int. Cl.
*G02F 1/1333* (2006.01)
*G02F 1/1335* (2006.01)
*G02B 1/04* (2006.01)
*F21V 8/00* (2006.01)
*G02F 1/1343* (2006.01)

(52) U.S. Cl.
CPC ......... *G02B 6/0058* (2013.01); *G02B 6/0078* (2013.01); *G02B 6/0095* (2013.01); *G02F 1/13336* (2013.01); *G02F 1/133524* (2013.01); *G02F 1/134309* (2013.01); *G02F 2001/133388* (2013.01)

(56) References Cited

U.S. PATENT DOCUMENTS

| | | | |
|---|---|---|---|
| 8,585,598 B2 * | 11/2013 | Razzaque | A61B 8/4245 600/411 |
| 8,891,918 B2 * | 11/2014 | Li | G02B 6/0018 385/146 |
| 2005/0140613 A1 | 6/2005 | Lowe et al. | |
| 2007/0252935 A1 | 11/2007 | Kee et al. | |
| 2010/0238090 A1 | 9/2010 | Pomerantz et al. | |
| 2011/0102302 A1 | 5/2011 | Watanabe et al. | |
| 2011/0242686 A1 | 10/2011 | Watanabe | |
| 2013/0082901 A1 | 4/2013 | Watanabe et al. | |

FOREIGN PATENT DOCUMENTS

| | | |
|---|---|---|
| JP | S60 169833 A | 9/1985 |
| WO | 03/096117 A1 | 11/2003 |

OTHER PUBLICATIONS

Written Opinion for Application No. PCT/NL2014/050675 filed Oct. 1, 2014 on behalf of Miortech Holding B.V. dated Jan. 26, 2015. 10 pages.

* cited by examiner

OPTICAL SEAM REDUCTION

CROSS REFERENCE TO RELATED APPLICATIONS

The present application is the US national stage of International Patent Application PCT/NL2014/050675 filed internationally on Oct. 1, 2014, which, in turn, claims priority to Netherlands Patent Application No. 2011561 filed on Oct. 4, 2013.

FIELD OF THE INVENTION

The invention relates to an optical wave guide panel for visualization of an image visual presentation an assembly comprising at least one visual presentation and a corresponding optical wave guide panel, a visual presentation and a method of manufacturing a visual presentation assembly.

BACKGROUND

Certain visual presentations may comprise an image portion and be surrounded by a frame portion, which frame portion does not contain image information. When such an image is to be visually presented, such that the frame portion is not visible, but within the limits defined by the outer circumference of the frame portion, optical means can be used to enlarge the image such that it can be viewed within the outer circumference of the frame portion, by guiding light irradiated from or reflected from the image surface.

Such optical guidance means are known for example from U.S. Pat. No. 4,139,261 where by means of optical fibers a composite visual presentation of increased area is constructed. The fiber optic image transform construction of this guidance means is arranged in front of a plurality of visual presentation panels for transforming an image collectively provided by panels into a corresponding continuous image in which discontinuities between adjacent panels visual presentation zones are eliminated.

In published US patent application 2011/0102302 A1 a direct viewing type visual presentation device is disclosed having at least one visual presentation panel having visual presentation region and a frame region provided outside a visual presentation region with a boundary extending along the first direction between a visual presentation region and a frame region and at least light transmitting cover disposed on a viewer side of the at least one visual presentation panel. The panel cover includes a lens portion disposed a astride the boundary for refraction a portion of light emitted from a visual presentation region towards the frame region and a viewer side surface of the lens portions is a curved surface and a rear side surface of the land portion is also a curved surface. This structure allows seamless visual presentation of an image in a case of tiled images.

Furthermore from published US patent application no. 2005/0140613 A1 an image visual presentation is disclosed comprising an image visual presentation device having a ray of electrically driven picture elements which are viewable at a viewing interface surface. An optical device comprising a plurality of mechanically bonded waveguides having a surface adapted to a surface of an image or visual presentation to be visually presented and a viewing interface surface, wherein optical wave guide fibers guide the light from the image side to the viewing side of the panel such that the image can be viewed at the viewing interface surface side having an apparent form and size corresponding to the outer circumference of the image edge.

Solutions having optical fibers, such as U.S. Pat. No. 4,139,261 and US 2005/0140613 A1 are disadvantageous as the fibers comprised in such solutions are to be mechanically bonded and supported. Other solutions such as described in US2011/0102302 comprising a lens like optical guidance are disadvantageous since their viewing angle may be limited.

SUMMARY

It is therefore an object of the invention to provide optical guidance means that overcomes the disadvantages known in the art. The object is achieved in an optical wave guide panel for visualization of an image, wherein the panel is fabricated from a transparent solid material. The panel comprises an image interface surface and a viewing interface surface opposite the image interface surface, at least one boundary, a pattern of grooves, the grooves extending at least partially into the panel between the image interface surface and the viewing interface surface of the panel. The pattern of grooves comprises at least one groove following a contour of the at least one boundary of the panel. The boundary of the panel exhibits an angle with respect to the at least one groove, such that a length of a panel segment, defined by the groove following the contour of the at least one boundary and the boundary at the viewing interface surface, along a cross section of the panel transverse to a direction of said at least one groove is greater than a length of the segment at the image interface surface along the cross section.

This causes light irradiating from or reflected on the image interface surface to spread over the viewing interface surface. The image part covered by the image interface surface delimited by at least one groove and the boundary appears enlarged at the viewing interface surface, and may be viewed from a larger range of a viewing angles. Due to the grooves which extend at least partially into the panel towards a viewing interface surface, the panel is formed continuously. Thus it is no longer necessary to position and fixate optical wave guide fibers in order to obtain the desired effects.

In an embodiment, the grooves extend at least partially into the panel from the image interface surface towards the viewing interface surface of the panel.

In an embodiment the optical wave guide panel comprises an inclined side of the panel. The inclined side allows reflection of incident light at the viewing interface surface towards the image interface surface and vice versa.

In an embodiment the boundary comprises the curved side of the panel. This allows more freedom in the design and manufacturing of the wave guide panel with respect to optimization of visibility of the seams as a function of the viewing angle.

In a further embodiment the optical wave guide panel comprises a truncated edge, such as a facet or a curved surface extending from the viewing interface surface to substantially the boundary up to the upper level of the at least one groove. This allows a larger viewing angle at the viewing interface surface side of the panel and less distortion of a perceived picture element size at the truncated edge of the panel.

In an embodiment the boundary comprises a side of a wedge shaped groove, partially extending perpendicularly from the image interface surface into the panel. This allows a plurality of optical wave guide panel segments to be formed from a single panel, such that a plurality of images of the image interface surface can be accommodated.

In an embodiment the panel material has a first optical refractive index and each groove is filled with a medium having a second optical refractive index, lower than the first optical refractive index. This allows incident light in and light irradiated from the visual presentation to be reflected along the grooves.

In an embodiment, the grooves are formed in a first surface in a regular pattern. This allows application of the panel in combination with for example pixel oriented visual presentations as image forming device at the image interface surface side of the panel. Pixel oriented devices generally have the pixels arranged in a regular pattern. In a further embodiment the panel has a rectangular or a square shape. This also allows application of the panel with image forming devices or images which have such rectangular or square shape.

In a further embodiment the at least one groove following the boundary is positioned parallel to the boundary.

In an embodiment of the optical waveguide panel, the grooves are found perpendicular relative to the image interface surface. The allows for easy manufacturing of the grooves, since all grooves have the same perpendicular angle with respect to the image interface surface. As the area of the image interface surface between the groove and boundary of the panel is smaller than the predicted area of the viewing interface surface opposite of the panel, the effect of masking the frame portion of the image or visual presentation placed at the image interface surface side of the panel is preserved.

In an embodiment the grooves of the optical wave guide panel are found in a fan-shaped fashion in a cross section of the panel perpendicular to the grooves. The allows an even distribution of the grooves as viewed from the image interface surface side and the viewing interface surface side of the panel respectively. This is especially advantageous for interfacing with visual presentations having picture elements or pixels of equal size arranged in a regular pattern.

The object is also achieved in a visual presentation assembly comprising at least one visual presentation and a corresponding optical wave guide panel as described above. The wave guide panel is mounted on a visual presentation, the visual presentation comprises an image portion having image elements and a frame portion, wherein the dimensions of the optical wave guide panel image interface surface matches with the dimensions of the image portion of the visual presentation, such that the boundary of the optical wave guide panel overlaps with the frame portion of the visual presentation.

The assembly allows multiple visual presentations to be presented by means of the corresponding wave guide panels whereby the seams formed by the frame portions of the visual presentations are made invisible. Thus an integrated visual presentation assembly having multiple visual presentations appears to a viewer as a single visual presentation, not showing seams or frame portions.

In an embodiment the optical wave guide panel corresponds to a plurality of visual presentations arranged in tiles positioned adjacent to each other.

In an embodiment the boundary of the optical wave guide panel is positioned such that it is aligned with a transition between two visual presentations.

In an embodiment a medium is applied between said optical wave guide panel and said visual presentation, wherein the medium has a refractive index which approximate refractive index of the material of the optical wave guide panel. This allows light emitted from the visual presentation, or reflected therefrom without reflection of said reflected or emitted light by the image interface surface.

In another embodiment, the panel comprises a diffusion layer applied to said viewing interface surface. This causes light emitted from picture elements from a light emitting visual presentation at the image interface surface, such as a display or incident light to be diffused such that the picture elements appear evenly across its surfaces, reducing any reflected light by the grooves or boundary and masking any obstructive visible feature at the viewing interface surface of the panel, such as undesired reflections from the grooves.

The object is also achieved in a visual presentation comprising an image portion having image elements and a frame portion, wherein the image elements adjacent to said frame portion have a width such that the width of said image elements added to a width of said frame portion equals a width of image elements non-adjacent to said frame portion. Such a visual presentation having pixels with unequal size at the frame portion of the visual presentation, where the size is compensated for the width of the frame portion of the visual presentation, can be used in combination with an optical wave guide panel having grooves formed perpendicularly to the image interface surface of the panel, provided that the grooves are aligned with the pixel boundaries of the visual presentation.

In a preferred embodiment the visual presentation has a rectangular or square shape.

The object is also achieved in a method for manufacturing a visual presentation assembly as described above. The method comprises the steps of providing a visual presentation comprising an image portion having image elements and a frame portion, providing an optical wave guide panel, joining the visual presentation and the optical wave guide panel, aligning a frame portion of the visual presentation with the boundary of the optical wave guide panel and aligning the grooves in the panel with corresponding image element boundaries.

In an embodiment the step of joining further comprises applying a medium between said optical wave guide panel and the visual presentation, wherein the medium as a refractive index approximates the refractive index of the material of the optical wave guide panel.

DETAILED DESCRIPTION

Figure 1A:
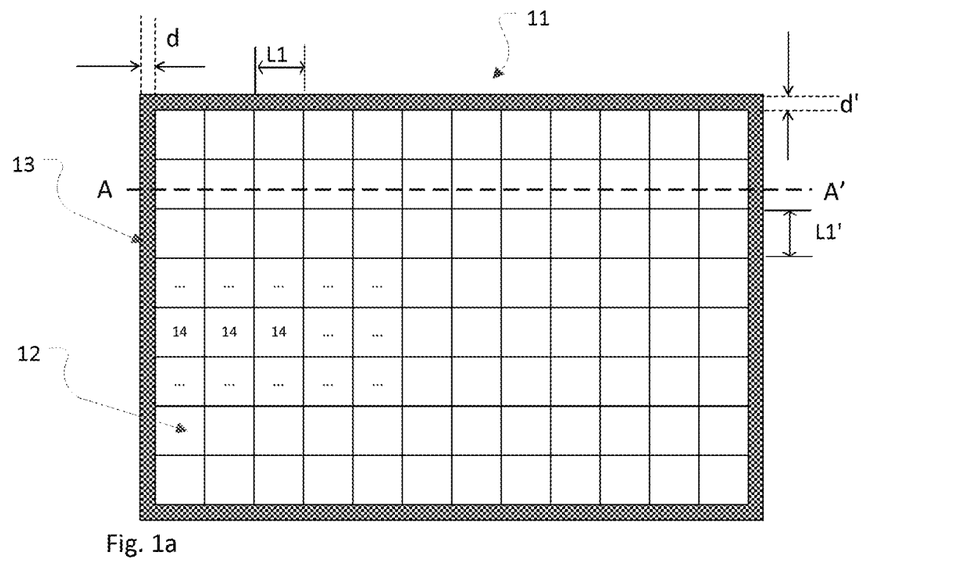
FIG. 1a shows a top view of visual presentation.
Figure 1B:
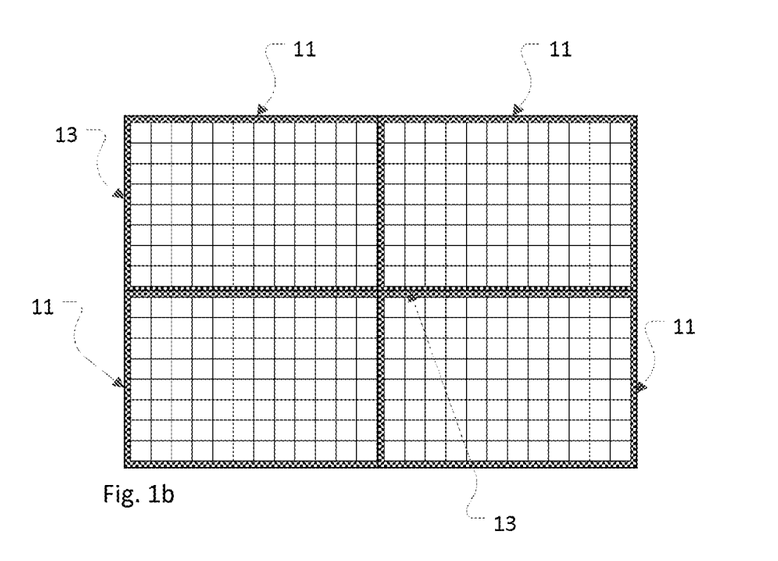
FIG. 1b shows a combination of visual presentations arranged adjacent to each other.

FIG. 1a shows a visual presentation 11 having an image portion 12 and a frame portion 13. The image portion 12 is subdivided into picture elements 14, however a plain image portion is also possible. The visual presentation 11 in the example of FIG. 1a is shown having a rectangular shape, but also other regular shapes, but not necessarily rectangular may apply. Image portions 12 having picture elements 14, such picture elements can have dimensions L1, L1'. The frame portion may have dimensions d or d' for horizontal and/or vertical portions respectively. FIG. 1b shows four visual representations according to FIG. 1a, connected together at the frame portions 13 were appropriate. A connection of two respective frame portions 13 causes a seam to be visible which causes a disturbance for a viewer in the overall view of the visual presentation combination.

Figure 1C:
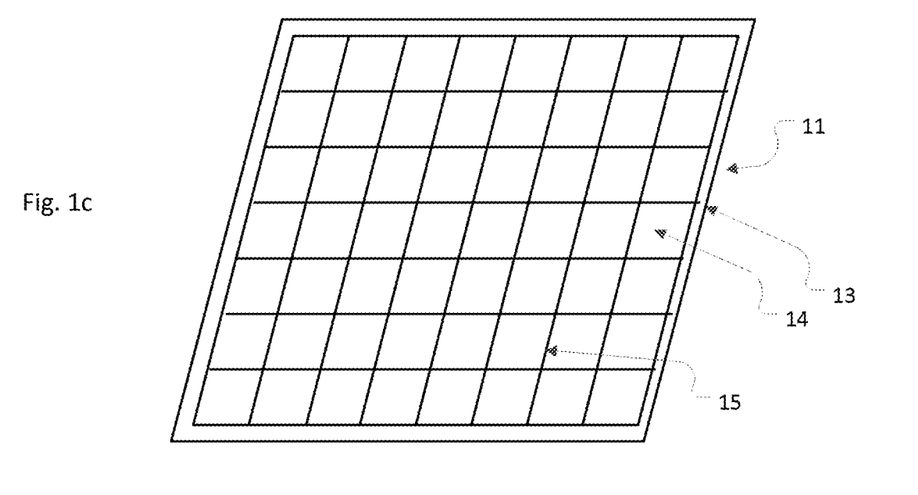
FIG. 1c shows an alternative top view of a visual presentation.
Figure 1D:
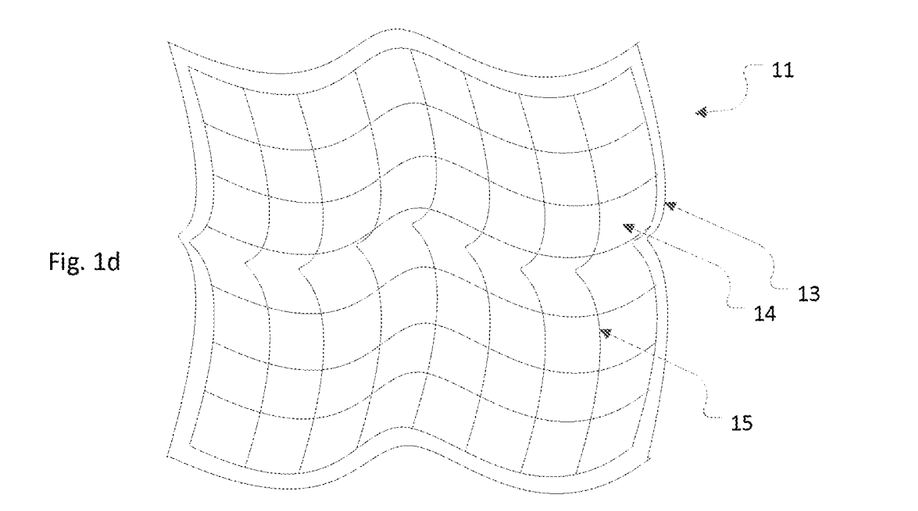
FIG. 1d shows an alternative top view of a visual presentation.

FIG. 1c shows a viewing interface surface, i.e. top view, of an visual presentation 11 with picture elements 14 in a diamond shaped pattern. The picture elements 14 and boundaries 15 between the picture elements 14 may be curved, as is shown in FIG. 1d. The shape of the visual presentation may be designed such that a plurality of presentations can be concatenated, i.e. tiled with an together with subsequent optical waveguide panels 21 according to the invention.

Figure 2A:
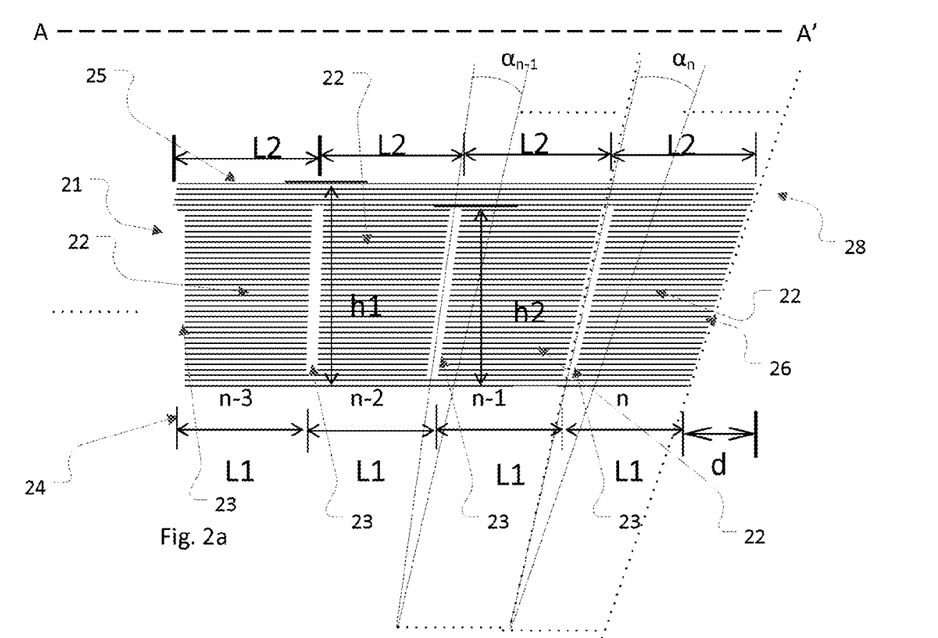
FIG. 2a shows a cross section of an optical waveguide panel according to an embodiment of the invention.

FIG. 2a shows a partial cross section of an optical waveguide panel 21 to be aligned with a visual presentation according to FIG. 1a along the line A-A'. The optical wave guide panel 21 extends in the two dimensions corresponding to a visual presentation 11 according to any of the FIGS. 1a-1d. The optical wave guide panel 21 has a viewing interface surface 25 and an image interface surface 24 for interfacing with the image portion 12 of a visual presentation 11. The optical waveguide panel 21 has grooves 23 extending into the waveguide panel 21 body, thereby forming segments 22 $n$-3, $n$-2, $n$-1, $n$. Each groove 23 has its own angle with respect to its predecessor and successor as shown for example between segments 22 $n$-2, $n$-1 having a respective angle $\alpha_{n-1}$ and segment n-1 and n having a respective angle $\alpha_n$ with respect to the boundary 26 of the waveguide panel 21. In this fashion, the grooves as viewed along the cross section are structured in a fan-shaped manner. The optical waveguide panel 21 has grooves 23 structured likewise in the transverse direction of the line A-A' corresponding to any one of the examples of the visual presentation of FIGS. 1a-1d.

Figure 2B:
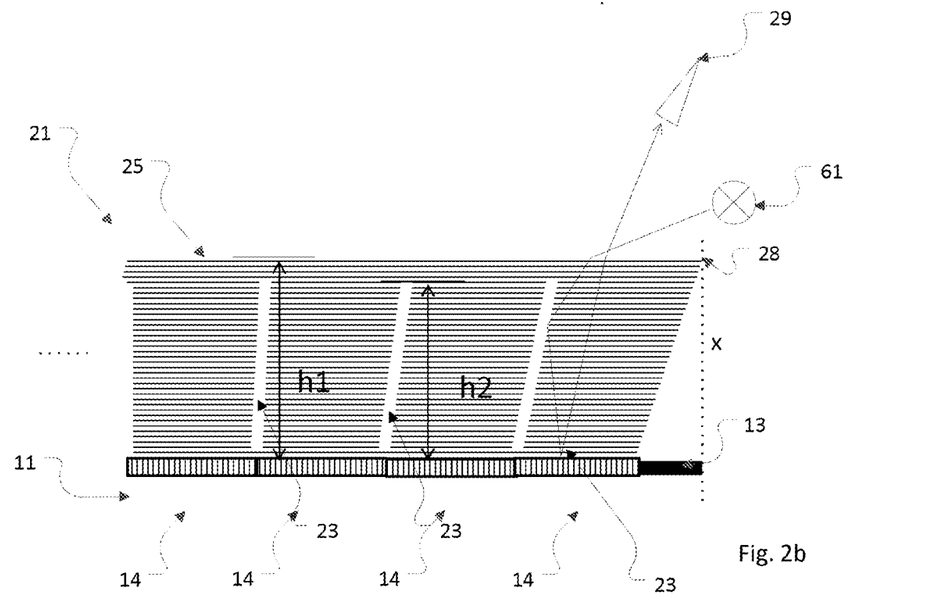
FIG. 2b shows a cross section of the optical waveguide panel of FIG. 2a in combination with a cross section of an visual presentation.

The grooves 23 in FIGS. 2a-2b are shown extending into the panel 21 between the image interface surface 24 to the viewing interface surface 25. The grooves 23 can be formed from the image interface surface 24 into the panel 21 by for example laser cutting. The grooves 23 may be closed at the image interface surface 24 after cutting by partially filling with for example a resin which is cured afterwards, as shown in FIGS. 2a and 2b. In that case also another medium is possible. Likewise the grooves 23 can be formed starting from the viewing interface surface 25 side.

As is shown in FIG. 2a, the segments 22 have a length L1 when viewed from the image interface surface 24 side, whereas at the viewing interface surface side 25 of the panel 21 the segments have a length L2 in the direction A-A' at the image interface surface side 24, which is larger than L1, caused by the successive angles between the grooves 23 separating each segment 22 $n$-3, . . . , $n$.

The thickness of the optical waveguide panel 21 is denoted by "h1" and the depth of the grooves 23 extending into the panel is denoted by "h2". The length L2 is defined by the intersections of the grooves 23 with the viewing interface surface 25 if the grooves 23 would be extended all the way through the optical waveguide panel 21.

The boundary 26 of the optical waveguide panel 21, at the last segment 22 near the edge of the panel 21 substantially has an inclined surface, such that the viewing interface surface 25 has a length L2 along the line A-A' which is larger than the corresponding length L1 along the image interface surface 24, the difference at boundary 26 being denoted by d.

The optical waveguide panel 21 is constructed from an optical transparent material, such as glass, Perspex, acryl, polycarbonate, etcetera. When left open the grooves 23 are preferably filled with air as medium, but other media may be used as long as the medium refractive index is lower than the refractive index of the panel 21 material. A medium other than air can be used especially when the grooves 23 are closed after cutting and filling with the medium. In such case the grooves 23 can alternatively be cleared of any medium and put into a vacuum state.

The viewing interface surface 25 may be provided with a diffusion layer for example by applying a diffuser film to its surface. Otherwise, the viewing interface surface 25 may be etched or otherwise modified to this effect.

In FIG. 2b the cross section of the optical waveguide panel 21 is shown in combination with a cross section of a visual presentation 11 subdivided into picture elements 14. The optical waveguide panel image interface surface 24 is aligned with the visual presentation 11 such that the image interface surface 24 contacts a top surface of the visual presentation 11 and the frame portion 13 of the visual presentation 11 is aligned with the edge 28 of the viewing interface surface 25 of the optical waveguide panel, see dotted line x. A viewer 29 at the viewing interface surface 25 side of the panel 21 viewing the visual presentation 11 at the image interface surface 24 side of the panel 21, will perceive the visual presentation 11 subdivided in segments determined by the grooves 23 as determined at level h2 at the surface of the image portion of the visual presentation 11, slightly enlarged and such that the frame portion 13 of the visual presentation 11 is hidden underneath edge 28 of the panel viewing interface surface 25.

A viewer 29 viewing the viewing interface surface 25 of the panel 21 perceives light emitted from a light source 61 which is refracted by the image interface surface 25, specularly or diffusely reflected by the picture element 14 of the visual presentation 11, reflected by the groove 23 and refracted towards the viewer 29 by the viewing interface surface 25.

A transparent, light conducting second medium can be inserted between the top side of the image forming portion 12 of the visual presentation 11 and the image interface surface 24 of the optical wave guide panel 21, not shown in FIG. 2b. The optical refractive index of the second medium is preferably near the optical refractive index of the panel 21 material, such that light can be exchanged between the panel 21 and the visual presentation 11 such that reflection at the image interface surface 24 of the optical waveguide panel is minimal. For this purpose for example acrylic Tesa ACX$^{plus}$ film can be used.

Figure 2C:
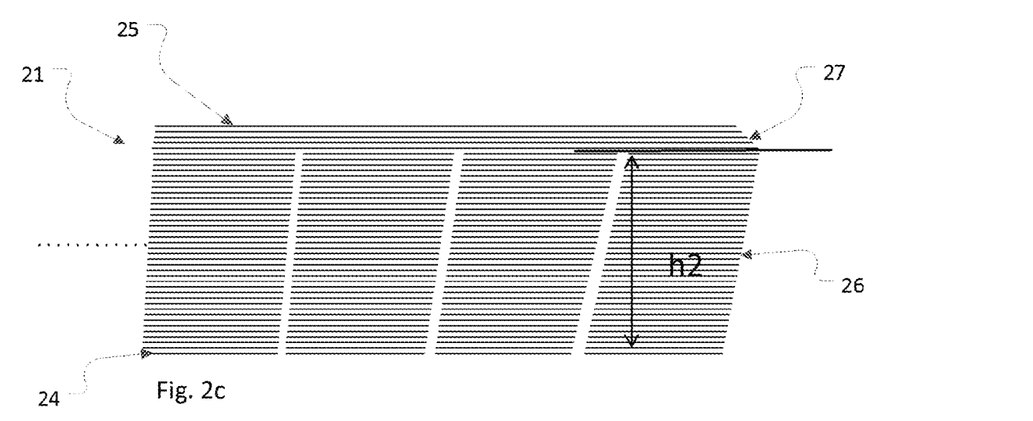
FIG. 2c shows a cross section of the optical waveguide panel, according to an embodiment of the invention.

The edge 28 in FIG. 2b can be truncated as shown in FIG. 2c for example by means of a facet 27. Instead of a facet, the boundary may also be curved. The truncated edge 27 extends from the viewing interface surface 25 towards the boundary 26 of the panel 21 such that it intersects with the boundary 26 at a distance approximately h2 from the image interface surface 24 of the panel 21. This allows a larger viewing angle at the viewing interface surface side of the panel and less distortion of the perceived pixel size at the edge of the panel.

Figure 2D:
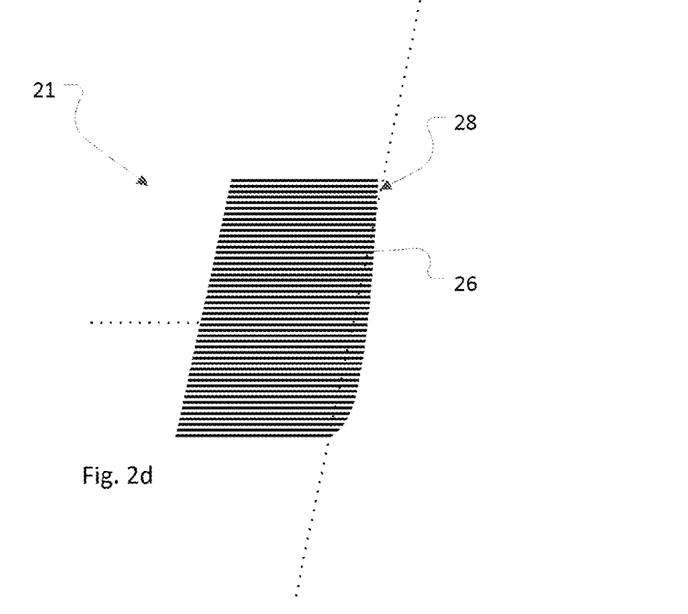
FIG. 2d shows an end section of an optical waveguide panel according to an embodiment of the invention.

The boundary 26 which is shown in FIGS. 2a-2c as an inclined side of the panel 21, may also be curved as shown in FIG. 2d. This allows more freedom in the design and manufacturing of the wave guide panel with respect to optimization of visibility of the seams as a function of the viewing angle.

Figure 3A:
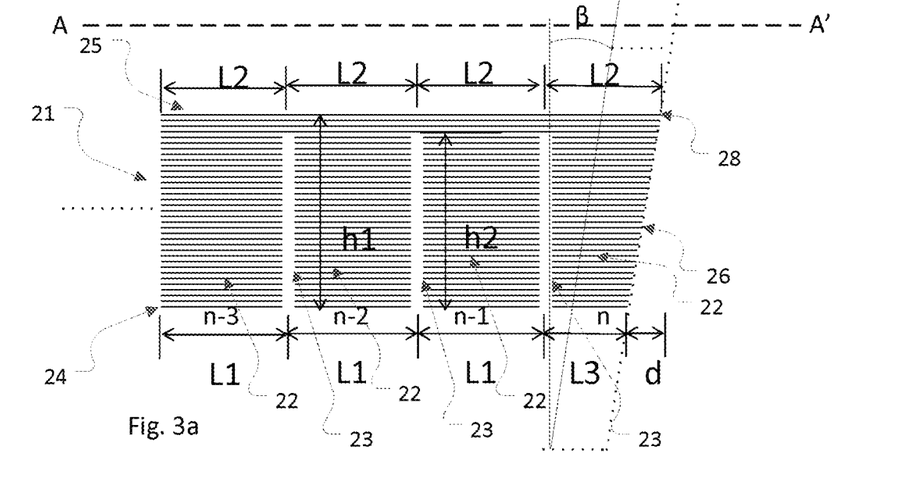
FIG. 3a shows a cross section of an optical waveguide panel according to an embodiment of the invention.
Figure 3B:
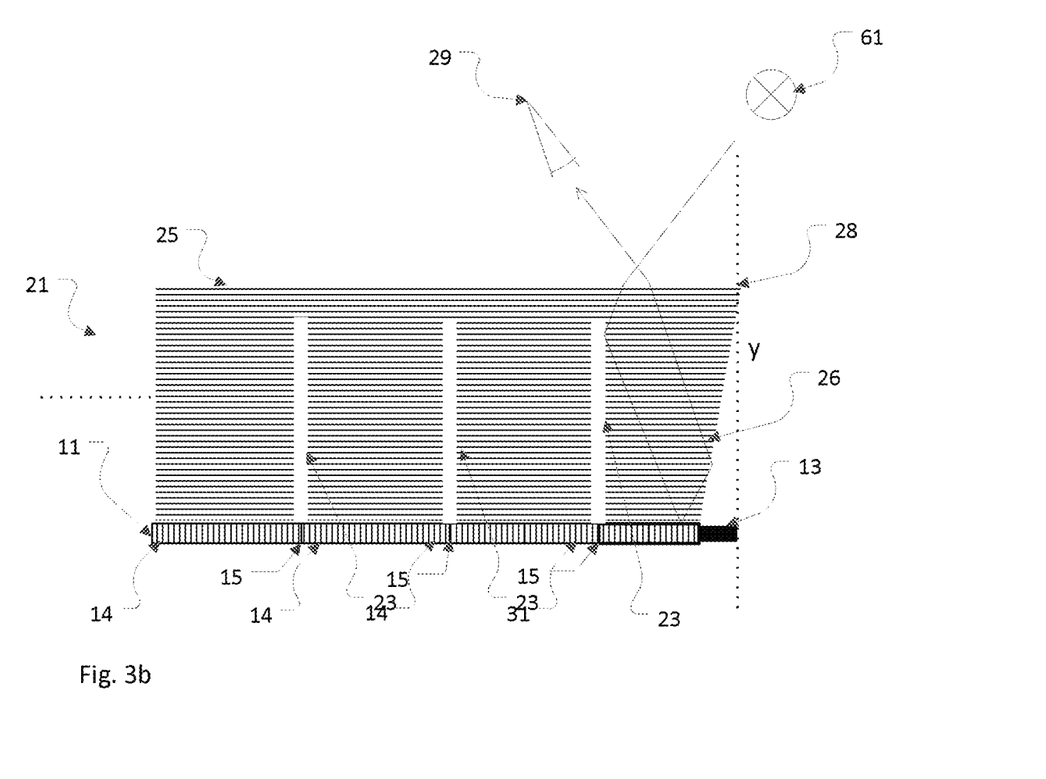
FIG. 3b shows the cross section of the waveguide panel according to FIG. 3a in combination with a visual presentation.
Figure 4:
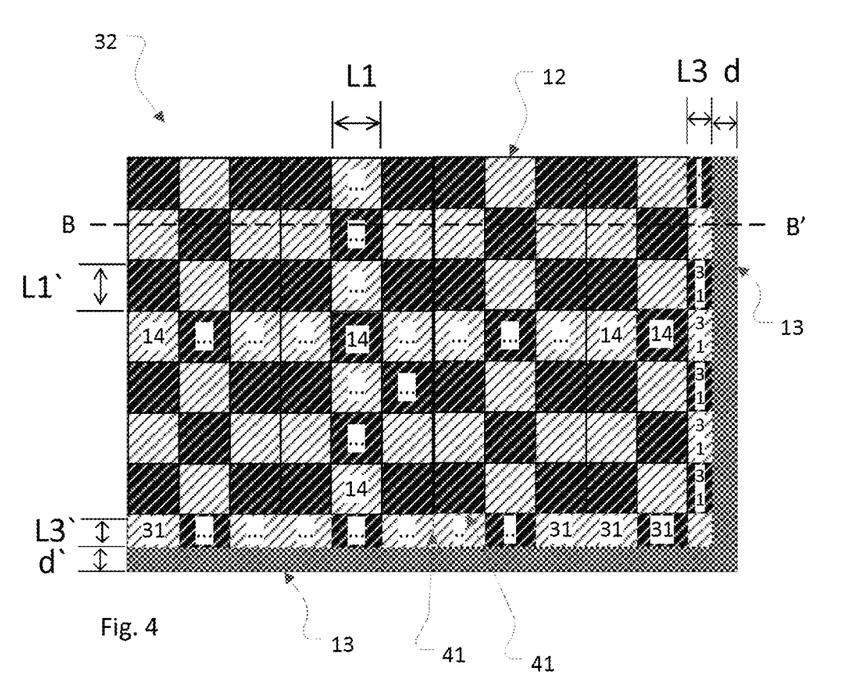
FIG. 4 shows a visual presentation adapted according to an embodiment of the invention.

FIG. 3a shows a partial cross section of an optical waveguide panel 21 to be aligned with a visual presentation 32 along the line B-B' of FIG. 4. In FIG. 3a it is shown that the grooves 23 may also extend perpendicularly with respect to the image interface surface 24 into the panel 21. Also in FIGS. 3a (and 3b) it is shown that the grooves 23 can extend from the image interface surface 24 into the panel 21. An outer most groove 23 has an angle β with boundary 26 of the panel 21. The boundary 26 is shown as inclined side of the panel such that edge 28 projects from the panel over a distance d.

As a consequence the segments 22 n-3, n-2, n-1 do not have the same length L1 along the line A-A' in comparison with segment 22 n. Segment n is substantially shorter than for example segment n-1, such that L1=L2=L3+d.

As a consequence, when the panel of FIG. 3a is combined with the visual presentation 11 as is shown in FIG. 3b, an edge picture element 31 of the image portion of the visual presentation 11 has to be aligned with the shorter base with length L3 of the image interface surface 24 of the panel 21. Edge 28 of the viewing interface surface 25 of the panel 21 is aligned with the outer edge of the frame portion 13 of the visual representation 32 of FIG. 4. Like in FIG. 2b, a viewer 29 viewing the visual presentation 11 through the optical waveguide panel 21 will perceive the edge of the image portion of the visual presentation 32 having the same size L2 as the other picture elements 14 of the image portion of the visual presentation 32.

Like in the example of FIG. 2b, but not shown in FIG. 3b, a second medium can be applied between the visual presentation 32 and the optical waveguide panel image interface surface 24, to minimize reflection at this interface surface 24. Illustrated in FIG. 3b is also light from a light source 61 reflected at the boundary 26, a top surface of a picture element 14 of visual presentation 11, groove 23, refracted at the viewing interface surface 25, reaches a viewer 29 at the viewing interface surface side of the panel 21. Edge 28 is aligned with the frame portion 13 of the visual presentation 11 along line y. Furthermore, like in FIG. 2c, edge 28 can be a truncated edge 27.

Figures 5A, 5B:
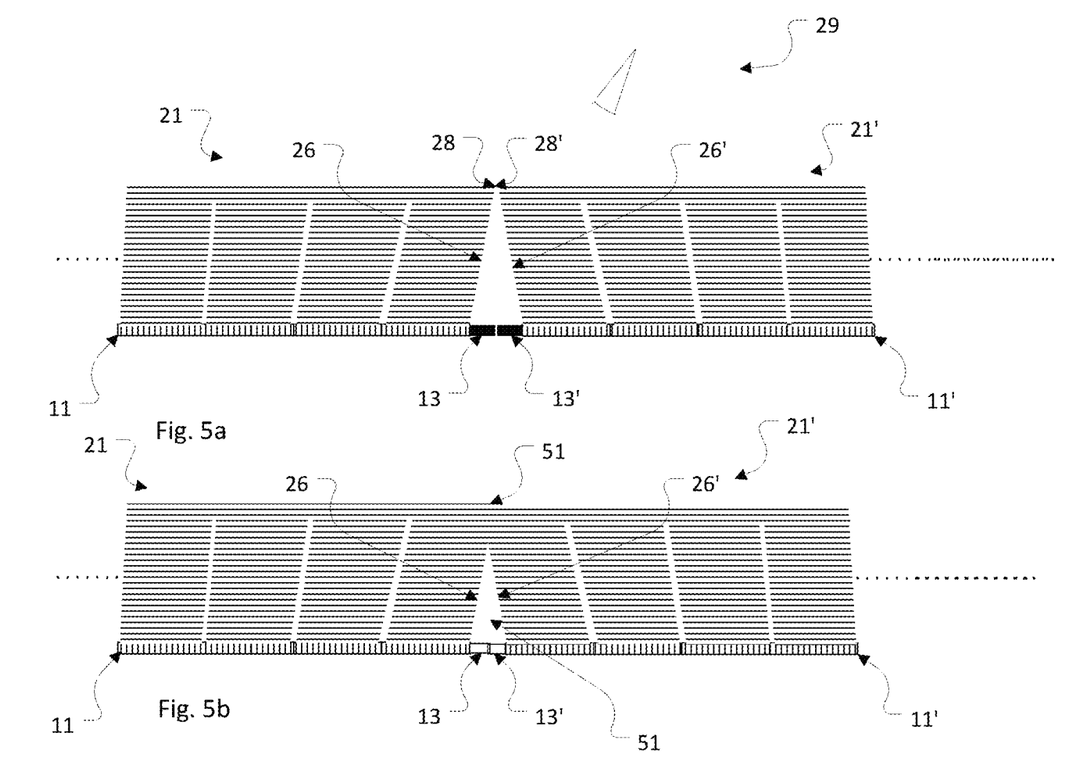
FIG. 5a shows a cross section of a combination of two optical waveguide panels according to an embodiment of the invention.
FIG. 5b shows a cross section of a combination of two optical waveguide panels according to an embodiment of the invention.

FIG. 4 shows a visual presentation 32 for use with the optical waveguide panel 21 of FIGS. 3a and 3b. Picture element 31 bordering the frame portion 13 of the visual presentation 32 has smaller dimensions L3, L3' than the picture elements 14 in the central part of the visual presentation portion 12 of the visual presentation 32 to compensate for the length d, d' of the frame portion 13 of the visual presentation 32. FIGS. 5a and 5b show variations of the way more than one optical waveguide panels 21, 21' can be combined. In FIG. 5a the panels 21, 21' are aligned such that the edges 28, 28' of the viewing interface surfaces 25, 25' of those panels 21, 21' are aligned. As a consequence, it is clear that frame portions 13, 13' of the visual presentation 11, 11' are no longer visible for a viewer 29 viewing the combination of panels from the viewing surface 25 side.

In FIG. 5b it is shown that the edge portions 28, 28' of the respective panels 21, 21' can be merged, such that at the junction 51 the respective panels 21, 21' appear as a single panel. In both FIGS. 5a, and 5b, the boundary 26, 26' in cooperation with the grooves 23, 23' cause visual presentations 11, 11' to appear as one, such that frame portions 13, 13' are no longer visible.

For all examples, a visual presentation 11, 32 may be formed by a picture, photo, drawing, poster and even a decoration tile and the like. Preferably a visual presentation is formed by a display, such as an Liquid Crystal Display, LED display, electrowetting display and the like, which have an image portion having picture elements or pixels in a regular pattern. The optical wave guide panels 21 described above have grooves 23 and segments 22 that correspond to the pixel pattern of the display, such that the pattern of grooves 23 in the image interface surface 24 of the panel 11, 32 align with the picture element boundaries 41 of the display or visual presentation 11, 32. Vice versa, picture elements 14, 31 of visual presentations 11, 32 may be designed to correspond to the grooves 23 pattern at the image interface surface 24 of an optical waveguide panel 21.

All embodiments described above are presented by way of example only, not limiting the scope of protection conferred by the claims presented below.

The invention claimed is:

1. An optical wave guide panel for visualisation of an image, wherein the panel is fabricated from a transparent solid material, the panel comprising:
   an image interface surface and a viewing interface surface opposite the image interface surface;
   at least one boundary;
   a pattern of grooves, the grooves extending into the panel between the image interface surface and the viewing interface surface of the panel;
   wherein the pattern of grooves comprises at least one groove following a contour of the at least one boundary of the panel; wherein the boundary of the panel exhibits an angle with respect to the at least one groove, such that a length of a panel segment, defined by the groove following the contour of the at least one boundary and the boundary at the viewing interface surface, along a cross section of the panel transverse to a direction of said at least one groove is greater than a length of the segment at the image interface surface along the cross section wherein said optical wave guide panel is formed from a single panel and the grooves extend partially into the panel from the image interface surface towards the viewing interface surface of the panel.

2. The optical wave guide panel according to claim 1, wherein the boundary comprises an inclined side of the panel.

3. The optical wave guide panel according to claim 1, wherein the boundary comprises a curved side of the panel.

4. The optical wave guide panel according to claim 1, further comprising a truncated edge extending from the image interface surface to the boundary to approximately the level of the at least one groove.

5. The optical wave guide panel according to claim 1, wherein the boundary comprises a side of a wedge shaped groove partially extending perpendicularly from the image interface surface into the panel.

6. The optical wave guide panel according to claim 1, wherein the panel material has a first optical refractive index, and wherein each groove is filled with a medium having a second optical refractive index, lower than the first optical refractive index.

7. The optical wave guide panel according to claim 1, wherein the grooves are formed in the image interface surface in a regular pattern.

8. The optical wave guide panel according to claim 1, wherein the panel has a rectangular or a square shape.

9. The optical wave guide pattern according to claim 8, wherein the at least one groove following the boundary is positioned parallel to the boundary.

10. The optical wave guide panel according to claim 9, wherein the grooves are formed perpendicular relative to the image interface surface.

11. The optical wave guide panel according to claim 10, wherein the grooves are formed in a fan-shaped fashion in a cross section of the panel perpendicular to the grooves.

12. The optical wave guide panel according to claim 1, comprising a diffusion layer applied to said viewing interface surface.

13. A visual presentation assembly comprising at least one visual presentation and a corresponding optical wave guide panel for each visual presentation according to claim 1, mounted on the visual presentation, the visual presentation comprising an image portion having image elements and a frame portion, wherein the dimensions of the optical wave guide panel image interface surface matches with the dimensions of the image portion of the visual presentation, such that a boundary of the optical wave guide panel overlaps with the frame portion of the visual presentation.

14. The visual presentation assembly according to claim 13, wherein the optical wave guide panel corresponds to a plurality of visual presentations, arranged in tiles, positioned adjacent to each other.

15. The visual presentation assembly according to claim 14, wherein a boundary of the optical wave guide panel comprises the curved side of the panel and is positioned such that the boundary is aligned with a transition between two visual presentations.

16. The visual presentation assembly according to claim 13, having a medium applied between said optical wave guide panel and said visual presentation, wherein said medium has an optical refractive index which approximates the refractive index of the material of said optical wave guide panel segments.

17. A method of manufacturing the visual presentation assembly according to claim 13, comprising:
 providing a visual presentation comprising an image portion having image elements and a frame portion;
 providing an optical wave guide panel;
 joining said visual presentation and said optical wave guide panel;
 aligning a frame portion of said visual presentation with a boundary of said optical wave guide panel, and
 aligning the grooves in said panel with corresponding image element boundaries.

18. The method according to claim 17, the step of joining further comprising applying a medium between said optical wave guide panel and said visual presentation, wherein said medium has a refractive index which approximates the refractive index of the material of said optical wave guide panel.

* * * * *